(12) United States Patent
Lopushenko et al.

(10) Patent No.: US 10,503,529 B2
(45) Date of Patent: Dec. 10, 2019

(54) LOCALIZED AND PERSONALIZED APPLICATION LOGIC

(71) Applicant: SAP SE, Walldorf (DE)

(72) Inventors: Elena Lopushenko, Kyiv (UA); Michail Vasiltschenko, Schriesheim (DE); Yvonne Miklosch, Nussloch (DE); Ralph Debusmann, Ludwigsburg (DE); Holger Sievert, Hambruecken (DE); Guenther Fischer, Nussloch (DE)

(73) Assignee: SAP SE, Walldorf (DE)

(*) Notice: Subject to any disclaimer, the term of this patent is extended or adjusted under 35 U.S.C. 154(b) by 377 days.

(21) Appl. No.: 15/359,335

(22) Filed: Nov. 22, 2016

(65) Prior Publication Data
US 2018/0146070 A1    May 24, 2018

(51) Int. Cl.
*G06F 15/16* (2006.01)
*G06F 9/451* (2018.01)
*H04L 29/08* (2006.01)

(52) U.S. Cl.
CPC .............. *G06F 9/454* (2018.02); *H04L 67/26* (2013.01)

(58) Field of Classification Search
CPC ........... G06F 16/9535; G06F 16/24578; G06F 16/248; G06F 16/951; G06F 3/0482; G06F 16/958; G06F 19/00; G06F 21/606; G06F 3/0484; G06F 3/167; G06F 3/219; G06F 16/288; G06F 16/335; H04L 67/306; H04L 67/22; H04L 67/02
See application file for complete search history.

(56) References Cited

U.S. PATENT DOCUMENTS

| | | | |
|---|---|---|---|
| 7,257,775 B1 | 8/2007 | Jivakov et al. | |
| 8,497,796 B2 | 7/2013 | Shamilian et al. | |
| 8,990,688 B2 | 3/2015 | Lee et al. | |
| 9,116,600 B2 | 8/2015 | Gonsalves | |
| 2005/0163136 A1* | 7/2005 | Chiu | H04M 3/4938 370/401 |
| 2006/0107219 A1 | 5/2006 | Ahya et al. | |
| 2010/0325144 A1* | 12/2010 | Fischer | G06F 16/335 707/769 |
| 2011/0310001 A1 | 12/2011 | Madau et al. | |

(Continued)

FOREIGN PATENT DOCUMENTS

WO    WO 2011/0067454    6/2011

OTHER PUBLICATIONS

"Self-Optimizing User Interface", available online at www.cablelabs.com, Jul. 2, 2014, 4 pages.

(Continued)

*Primary Examiner* — Michael A Keller
*Assistant Examiner* — Thao D Duong
(74) *Attorney, Agent, or Firm* — Klarquist Sparkman, LLP (57) ABSTRACT

A system includes a memory and a semiconductor-based processor coupled to form logic circuits. The logic circuits provide a combined localization and personalization (LPN) web service to a computer application, receive a call from the computer application for recommendations to localize and personalize a computer application for a particular user, prepare a recommendation on which one or more reusable application logic modules to attach to a core logic of the computer application to localize and personalize application for the particular user.

17 Claims, 5 Drawing Sheets

(56) References Cited

U.S. PATENT DOCUMENTS

| | | |
|---|---|---|
| 2012/0059757 A1 | 3/2012 | Hurwitz et al. |
| 2014/0040760 A1* | 2/2014 | Randell ................ G06F 16/435 |
| | | 715/745 |
| 2014/0075336 A1 | 3/2014 | Curtis et al. |
| 2014/0188681 A1* | 7/2014 | Shahghasemi ......... G06Q 20/22 |
| | | 705/37 |
| 2014/0223491 A1 | 8/2014 | Bountour |
| 2014/0304620 A1 | 10/2014 | Xu et al. |
| 2015/0200832 A1 | 7/2015 | Kurniady et al. |
| 2015/0302303 A1 | 10/2015 | Hakim |
| 2017/0270432 A1 | 9/2017 | Sachdev et al. |
| 2018/0004544 A1 | 1/2018 | Vasiltschenko |
| 2018/0197190 A1 | 7/2018 | Debusmann |

OTHER PUBLICATIONS

Gajos et al., "Automatically Generating Personalized User Interfaces with Supple", Journal of Artificial Intelligence, May 23, 2010, 49 pages.

Reinecke, K., "Culturally Adaptive User Interfaces", available online at www.zora.uzh.ch, 2010, 260 pages.

Reinecke et al., "Predicting User Interface Preferences of Culturally Ambiguous Users", CHI 2008, Apr. 5-10, 2008, 6 pages.

* cited by examiner

510
providing, by a server, a combined localization and personalization (LPN) web service to a computer application implementing a microservices architecture and providing the web service as a combination of one or more microservices 512 using a base microservice to retrieve user meta data from a database and making the retrieved user meta data available for processing to the other microservices that may have been called to get their respective recommendations 514

520
receiving a call from the computer application for recommendations to localize and personalize the application logic for a particular user receiving a call the computer application at application run-time 522

530
preparing a recommendation on which one or more reusable application logic modules to attach to the core logic of the computer application to localize and personalize application for the particular user applying a pre-determined LPN rule to user information to select the one or more reusable application logic modules 532

534
retrieving user meta data on one or more of personal, cultural and behavioral characteristics of the user, technical characteristics of the client computer device used to access the computer application, and explicit user feedback 534

540
providing the recommendation to the computer application providing the recommendations to the computer application via a shared UI recommendations object 542 delivering the recommendations using push communications 544

550
presenting the computer application with the recommended one or more reusable application logic modules attached to the core logic of the computer application as the localized and personalized (LPN) application to the particular user

FIG. 5

LOCALIZED AND PERSONALIZED APPLICATION LOGIC

BACKGROUND

A computer application that is hosted on a server (e.g., on a cloud computing platform) may commonly target different markets or diverse groups of users across diverse regions (e.g., groups corresponding to different languages or cultures). The application logic is most likely coded in common for all users, but may have different versions coded to address variations in the regional, cultural and personal characteristics or needs of the diverse users. For example, a version of a grocery shopping application may be coded to provide a set of locally available grocery products for a first group of users in one country while another version of the application may have to be re-coded to provide another set of locally available grocery products for a second group of users in another country.

Even if a version of the computer application is individually customized to include an application logic module to address the characteristics or needs of a particular group of users, it is unlikely such an individualized application logic module can be reused for other computer applications. While coding different versions of the computer application may encourage acceptance of the computer application across the different markets or groups of users, it is expensive to code and maintain the different localized versions of the computer application.

Consideration is now being given to systems and methods for localizing and personalizing application logic used in a computer application targeting different group of users.

SUMMARY

A system for combined localization and personalization of a computer application presented to a particular user on a client computer device is described herein. The system includes a memory and a semiconductor-based processor that forming one or more logic circuits.

In a general aspect, the logic circuits are configured to provide a combined localization and personalization (LPN) web service to the computer application, receive a call from the computer application for recommendations to localize and personalize the application logic for the particular user, prepare a recommendation on which one or more reusable application logic modules to attach to a core logic of the computer application to localize and personalize application for the particular user as a localized and personalized application (LPN application) for the particular user, and provide the recommendation to the computer application to setup the LPN application.

The details of one or more implementations are set forth in the accompanying drawings and the description below. Further features of the disclosed subject matter, its nature and various advantages will be more apparent from the accompanying drawings, the following detailed description, and the claims.

BRIEF DESCRIPTION OF THE DRAWINGS

FIG. 5 is an illustration of an example method for combined localization and personalization of a computer application presented to a particular user on a client computer device, in accordance with the principles of the present disclosure.

DETAILED DESCRIPTION

Computer-implemented systems and methods for localization and personalization of a computer application are described herein. A generic version of the computer application (e.g., a Business-to-Consumer (B2C) retail application) may be coded to target a generic group of consumers whose characteristics (e.g., purchasing habits) may be defined, for example, by statistically averaging the characteristics of different group of users over regions or countries of the world. To differentiate and target a specific group of users (e.g., a regional or cultural group of users), the generic computer application may be localized or personalized by including in the generic computer application one or more reusable application logic modules that are specific to the specific group of users, in accordance with the principles of the present disclosure.

The reusable application logic modules may be "plug-in' or "add-on" type application logic modules that can be added on or attached to the generic computer application code ("core application logic").

Figure 1:
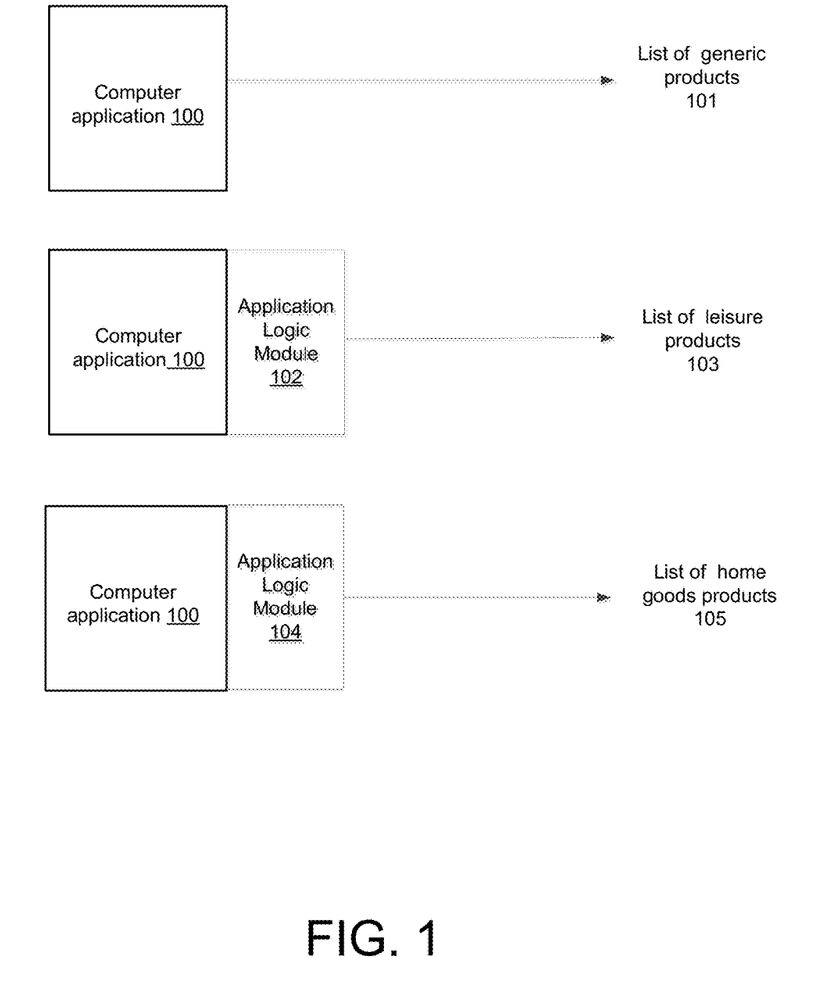
FIG. 1 is a schematic block diagram illustrating a generic computer application that includes core application logic to display a generic list of products to a user, and use of a reusable application logic module to customize the generic computer application for different users.

FIG. 1 shows, for example, a generic computer application 100 (e.g. a generic B2C application), which may include core application logic to display a generic list of products 101 to a user. The generic B2C application may be customized to serve leisure consumer markets, for example, by adding or attaching an application logic module 102 by which the generic list of products is shown as a list of leisure products 103. Further, the B2C application may be customized to serve the home goods consumer markets, for example, by including a different application logic module 104 by which the generic list of products is shown as a list of home goods 105.

A localization or personalization application logic module may be reusable in the sense that it could be attached to different computer applications (without any recoding or any substantial recoding) to localize or personalize the different computer applications.

Figure 2:
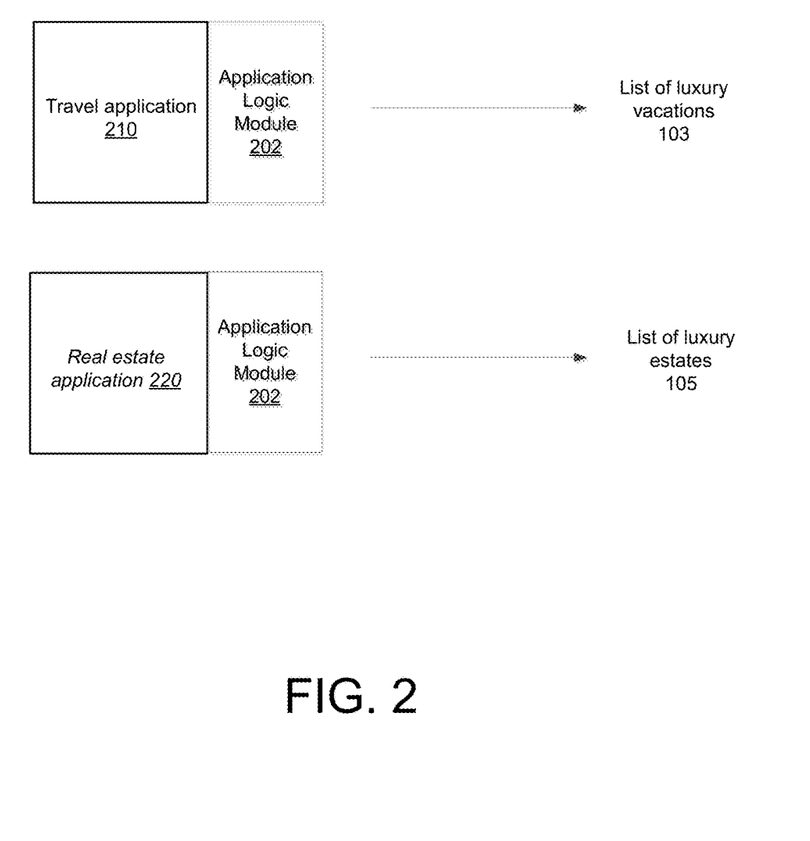
FIG. 2 is a schematic block diagram illustrating use of an added reusable application logic module to personalize a travel application for high income users to display a list of luxury vacations and use of the same reusable application logic module to personalize a real estate application to display luxury estates.

FIG. 2 shows, for example, a travel application 210 with an added reusable application logic module 202, which personalizes travel application 210 for high income users to display a list of luxury vacations. Further, the same reusable application logic module 202 may be used to personalize a real estate application 220 to display luxury estates.

A database may include a store of different reusable application logic modules that may be tailored, for example, to different regional or cultural group of users. The systems and methods for localization and personalization of a computer application described herein may simplify the application logic coding by using a Localized Personalization Service ("LPN" service) to select and add a pre-coded reusable application logic module to the core application logic of the computer application. The reusable application logic modules may provide the logic needed to incorporate regional, cultural and personal information in decisions of the application logic.

The combined localization and personalization of the application logic may be provided by a backend computer system as a remote service to the computer application to localize and personalize the application logic on a client computer device through which the particular user interacts with or accesses the computer application.

The combined localization and personalization of the application logic may involve adding or replacing one or more application logic modules in the computer application with other application logic modules. The additions and replacements may be based on information on characteristics of the particular user, the client computer device used, and the particular user's past or present usage of the client computer device. This information (which may be referred to herein as "user information", "user profile" or "user metadata") may include information on personal and cultural characteristics (e.g., the user's nationality, language, geographic location, computer usage habits, mouse movement/click behavior, etc.), information on technical characteristics (type of computing device, O/S used, network connection speed, etc.). The information on which the combined localization and personalization of the application logic is based may be dynamically collected in, and retrieved from, one or more databases or data stores.

The combined localization and personalization of the application logic for the particular user may involve applying a predetermined set of "localization and personalization" rules ("LPN rules") to the user information to select recommended application logic modules that should be assigned to and added to the application logic so that the computer application is localized and personalized for the particular user.

The systems and methods described herein may involve using an algorithm which, at run-time, applies the LPN rules to user information collected from various input channels to localize and personalize the application for the particular user. In example implementations, the user information to which the LPN rules are applied may include the user's IP address, additional user information provided by the user at time of sign in, user behavior (e.g., as analyzed using Machine Learning), explicit user feedback, etc.

Figure 3:
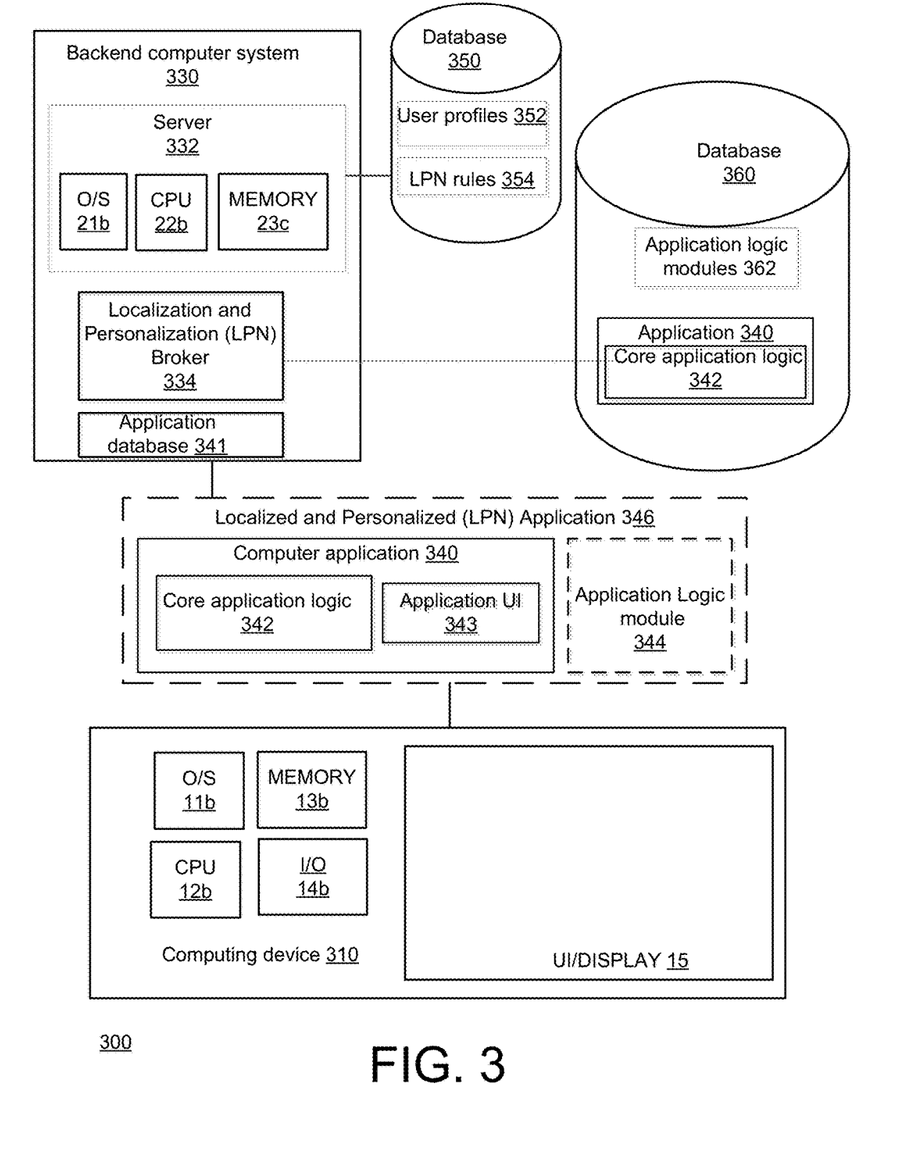
FIG. 3 is a schematic block diagram illustration of an example system for combined localization and personalization of a computer application, in accordance with the principles of the present disclosure.

FIG. 3 is a schematic block diagram showing an example system 300 for combined localization and personalization of a computer application (e.g., computer application 340), in accordance with the principles of the present disclosure.

System 300 may include a backend computer system 330 connected to a client computing device 310, a database 360 and a database 350. Database 350 may include user profiles 352 and LPN rules 354. Database 360 may include computer application 340 with its core application logic 342. Database 360 (or other database) may further include different reusable application logic modules 362 that may be used, for example, for localization and personalization of computer application 340.

Client computing device 310 may, for example, include an O/S 11b, a CPU 12b, a memory 13b, and I/O 14b, and a user interface (UI) or display 15. Backend computer system 330 may include one or more computing devices (e.g., sever 132) which like client computing device 310 may include computer components such as an O/S 21b, a CPU 22b and a memory 23c, etc. Although server 332 is illustrated in the example of FIG. 1 as a single computing device, it may be understood that server 332 may represent two or more computing devices in communication with one another. Therefore, it will also be appreciated that any two or more components of system 300 may similarly be executed using some or all of the two or more computing devices in communication with one another. Conversely, it also may be appreciated that various components illustrated as being external to server 332 may actually be implemented therewith.

In system 300, computer application 340 (e.g., before it is localized or personalized) may be hosted on one or more computers (including, for example, server 332, client computing device 310 or other virtual or physical machines). Computer application 340 may include application processes (e.g., core application logic 342) and a front end (e.g., application UI 343). Application UI 343 may be presented on client computing device 310 for a user to interact with or access computer application 340. Backend computer system 330 may also include a datastore (e.g., application database 341), which may store data consumed or generated by computer application 340.

In system 300, computer application 340 may initially include core application logic (e.g., core application logic 342) which may include, for example, logic for generic functions of the application. LPN service broker 334 may be used to select a reusable application logic module (e.g., application logic module 344) from database 360/application logic modules 362 to localize or personalize computer application 340 for a particular user or group of users. Computer application 340 may be localized and personalized for a user or group of users by adding application logic module 344 to core application logic 342 to form "Localized and Personalized (LPN)" application 346. LPN application 346 may be presented on client computing device 310 to the user.

Backend computer system 330, which may be coupled to database 350 and database 360, may include processes that are configured to provide a "localization and personalization" (LPN) service to adapt or modify computer application 340 (e.g., at run time) and present it as a localized and personalized application (e.g., LPN application 346). The LPN service may be provided as a web service, for example, by a "localization and personalization" (LPN) service broker 334 in backend computer system 330. The adaptation or modification of computer application 340 as LPN application 346 for a particular user or group of users may be based, for example, on user specific data (e.g., user profiles 352) retrieved from database 350 or other data stores. The adaptation or modification of computer application 340 as LPN application 346 for the particular user may involve implementing pre-determined localization and personalization rules (e.g., LPN rules 354) for various use contexts.

In an example implementation, LPN service broker 334 may have a microservices architecture (MSA) and may be configured to provide the LPN web service as a collection of one or more microservices (e.g., Base Microservice, Geographic Microservice, Spending Power Microservice, Events Microservice, etc.). In the example implementation, the collection of one or more microservices may include at least the Base Microservice while the other microservices (e.g., Geographic Microservice, Spending Power Microservice, Events Microservice, etc.) may be optional. The microservices may have access to user information (e.g., user profiles 352/database 350) and may accordingly generate respective recommendations for adapting or modifying computer application 340 as LPN application 346 for the particular user or group of users. In an example implementation, the recommendations may be delivered by LPN service broker 334 to computer application 340 using push technology (e.g., server push) communications.

Figure 4:
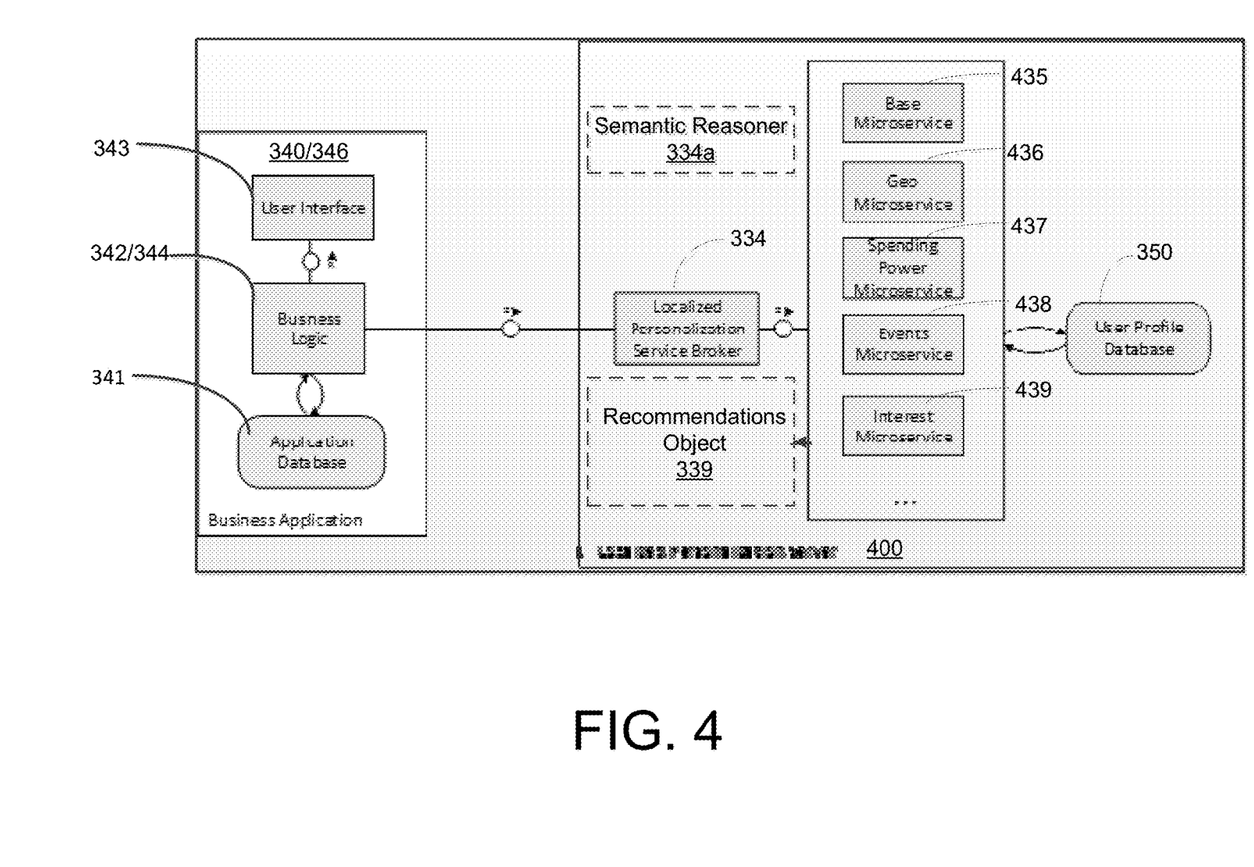
FIG. 4 is a schematic block diagram illustrating a microservices architecture (MSA) of a localization and personalization (LPN) service, which may be provided by a LPN service broker to a computer application at application run time, in accordance with the principles of the present disclosure.

FIG. 4 is a schematic block diagram illustrating the microservices architecture (MSA) of an example LPN web service 400, which may be provided by LPN service broker 334 to computer application 340 at application run time. LPN web service 400 may, for example, include one or more microservices (e.g., Base Microservice 435, Geographic Microservice 436, Spending Power Microservice 437, Events Microservice 438, Interest Microservice 439, etc.) for recommending which reusable application logic modules (e.g., application logic module 344) should be selected from application logic modules 362 to be added to computer application 340 for a particular user or group of users. Each of the microservices may generate a respective recommendation by processing data (e.g., user profiles 352) related to the particular user or group of users and implementing pre-determined localization and personalization rules (e.g., LPN rules 354).

In an example implementation, Geographic Microservice 436 may be configured to provide recommendations for which reusable application logic modules (e.g., application logic module 344) to attach to the core logic of computer application 340 based on the geography of the particular user (or a particular group of users). The recommendation may account for regional, cultural and personal preferences, for example, in naming geographic locations on a map, in choices of color, in the Operating Systems used, etc. The recommendations may be based applying a LPN rule based on the particular user's likely sensitivities or preferences (as determined from user profile 352) for geographical names. For example, if the particular user has Argentinian citizenship, Geographic Microservice 136 may recommend that a map should labelled "Malvinas" in accordance with the preferred Argentinian name for the islands instead of "Falkland Islands".

Further, in the example implementation, Spending Power Microservice 437 may be configured to provide recommendations for which reusable application logic modules (e.g., application logic module 344) to attach to the core logic of computer application 340 (e.g., a B2C application) based on information on the spending power of the particular user or group of users. The information on the spending power (e.g., income relative to prices of products or service) may be determined from user profile 352. The recommendations may account for the different spending powers of different consumers so that computer application 340 (e.g., a B2C application) can be targeted to specific consumers individually or by region.

Further, in the example implementation, Events Microservice 438 may be configured to localize and personalize the application logic of computer application 340 by incorporating knowledge about current events, or recurring events such as local holidays and festivals (e.g. Christmas, Ramadan, Diwali, etc.) in the application logic of computer application 340. Events Microservice 438 may to be configured to recommend which reusable application logic modules (e.g., application logic module 344) to attach to the core logic of computer application 340 (e.g., a B2C application) based on information on events, which may affect the particular user or groups of users targeted by computer application 340. Computer application 340 (e.g., a B2C application) may be localized and personalized, for example, to market specific products that may be suitable or appropriate for the local holidays and festivals (e.g. Christmas, Ramadan, Diwali, etc.).

Further, in the example implementation, Interest Microservice 439 may be configured to localize and personalize the application logic of computer application 340 by incorporating knowledge about the social, political, or cultural interests of the particular users or groups of users. Events Microservice 438 may to be configured recommend which reusable application logic modules (e.g., application logic module 344) to attach to the core logic of computer application 340 (e.g., a B2C application) based on information on the interests of the particular user or groups of users targeted by computer application 340. Computer application 340 (e.g., a news reporting application) may be localized and personalized, for example, to filter or rank new stories based on interests of the particular user or groups of users. For example, stories about the European Championships in soccer may be filtered out as not being of interest to users in the Americas to whom the Copa America tournament may be more important. As another example, computer application 340 (e.g., an automatic music playlist creating application) may be localized and personalized to create a customized streaming music playlist for French listeners who may prefer French artists.

LPN web service 400 may include any number of additional microservices, or alternate microservices other than the examples shown in FIG. 4. LPN web service 400 may, for example, include an Opting-Out Microservice, a Buy Local/Regional Products Microservice, an Offer Filtering Microservice, etc.

The Opting-Out Microservice may, for example, be configured to localize and personalize the application logic of computer application 340 (e.g., a B2C application) to automatically exclude certain products from being displayed to a user based on known user likes or dislikes. For example, if a customer is unhappy with "XYZ" brand products bought in the past, the Opting-Out Microservice may recommend an additional application logic module to exclude the XYZ brand products from being marketed to the user.

The Buy Local/Regional Products Microservice may, for example, be configured to localize and personalize the application logic of computer application 340 (e.g., a B2C application) to preferentially display products that are, for example, produced locally to users who are likely to preferentially consume locally produced products over products that are produced elsewhere. In another example, the Buy Local/Regional Products Microservice may, for example, be configured to localize and personalize the application logic of computer application 340 (e.g., a B2C application) to exclude display of products that originate from regions that the users are likely to avoid or boycott.

The Offer Filtering Microservice may, for example, be configured to localize and personalize the application logic of computer application 340 (e.g., a B2C application) to disable communications that the user may find annoying or irritating. For example, if a user has already purchased a particular product, the Offer Filtering Microservice may, for example, be used to localize and personalize the application logic of computer application 340 (e.g., a B2C application) to disable repeated communications (e.g., communications comparing better products or offering better prices for the particular product) which may irritate the user.

With renewed reference to FIG. 4, in operation, computer application 340 may call LPN service broker 334 to get recommendations on which reusable application logic module (e.g., application logic module 344) to attach to the core logic of computer application 340 to localize and personalize computer application 340 for a particular user or group of users. In example implementations, either computer application 340 itself or other component of backend computer system 330 or client computing device 310 may call LPN service broker 334 to get the recommendations for localizing and personalizing computer application 340. The call may be for a specific micro service or recommendation type (e.g., Geographic recommendation) or for a compound object of different micro services or recommendation types.

In response to the call, LPN service broker 334 may activate or call one or more of the individual microservices (e.g., Base Microservice 435, Geographic Microservice 436, Spending Power Microservice 437, Events Microservice 438, Interest Microservice 439, etc.) to get the recommendations for localizing and personalizing computer application 340.

In an example implementation, a called microservice (e.g., Events Microservice 438) may retrieve user-related information from the user profiles 352, which information may be shared by LPN service broker 334 with other microservices (e.g., Base Microservice 435, Geographic Microservice 436, Spending Power Microservice 437, etc.). Such sharing of retrieved user-related information may reduce the number of queries made by individual microservices to retrieve user-related information from user profiles 352.

Further, in some instances, the user-related information retrieved from user profiles 352 (e.g., retrieved by Geographic Microservice 436) may be analyzed (e.g., by logical reasoning) to infer additional facts about a user that may be useful for localizing and personalizing computer application 340. These additional facts may or may not be explicitly stored in user profiles 352. In an example implementation, LPN service broker 334 may include, or be coupled to, a "logical or semantic reasoner" (e.g., semantic reasoner 334a). Semantic reasoner 334a may be configured to process the user-related information retrieved from user profiles 352 to infer the additional facts that are not explicitly included in the retrieved user-related information or stored in database 350.

Semantic reasoner 334a (which, for example, may be based on "semantic web technologies") may be configured to access one or more knowledge bases, which may represent facts, for example, about computer usage, cultures, and human behavior, etc. Semantic reasoner 334a may reason about those facts and use rules and other forms of logic to infer additional facts that may be relevant, for example, to the user's present circumstances or context (e.g. location, device use, connectivity, history, etc.).

Semantic reasoner 334a may be configured to process the user-related information retrieved from user profiles 352 to determine the user's present circumstances and to discover or infer additional facts (e.g., from the knowledge bases) that may be relevant to customizing and personalizing computer application 340 based on the user's specific circumstances (e.g. location, device use, connectivity, history, etc.) at the time of the call to LPN service broker 334 to get the recommendations on which one or more reusable application logic modules (e.g., application logic module 344) to attach to the core logic of computer application 340 to localize and personalize computer application 340 for a particular user or group of users.

As an example of the operation of semantic reasoner 334a, the user-related information retrieved from user profiles 352 may include the fact that the user is located, for example, in South Africa. Semantic reasoner 134a may discover, for example, from a knowledge base, the fact that South Africa has poor quality Internet connections. Semantic reasoner 334a may logically infer from these facts (i.e. that the user is located in South Africa and that South Africa has poor quality internet connections) the additional fact: the user has a poor quality internet connection that is prone to frequent interruptions or breaks.

LPN service broker 334/semantic reasoner 334a may then, for example, apply a LPN rule (from LPN rules 354) for internet connection quality to this logically inferred additional fact (which may or may not be stored in database 350) to recommend disabling streaming video features in computer application 340 for localizing and personalizing computer application 340 for the user.

In an example implementation, LPN service broker 334 may always first call Base Microservice 435 to retrieve user-related information from the user profiles 352. LPN service broker 334 may then call one or more of the other individual microservices (e.g., Geographic Microservice 436, Spending Power Microservice 437, Events Microservice 438, Interest Microservice 439, etc.) to get the their recommendations for localizing and personalizing the computer application. The user-related information retrieved by the first called Base Microservice may be made available for processing to the other microservices that may have also been called to get their respective recommendations. Alternatively or additionally, the LPN service broker 334/semantic reasoner 334a may process the user-related information to logically infer additional facts useful for recommending features for localizing and personalizing computer application 340.

In an example implementation, LPN service broker 334 may first receive the base recommendations from the Base Microservice, and then the additional recommendations from the one or more of the other individual microservices (e.g., Geographic Microservice 436, Spending Power Microservice 437, Events Microservice 438, Interest Microservice 439, etc.). LPN service broker 334 may combine and store the respective recommendations received from the individual microservices in a shared object (e.g., recommendations object 339), which is then returned to computer application 340. Computer application 340 may, based on the recommendations in recommendations object 139, be localized and personalized for a particular user or group of users by attaching one or more reusable application logic modules (e.g., application logic module 344) to the core logic of computer application 340. The localized and personalized computer application 340 may be presented as LPN application 346 for the particular user or group of users on client computing device 310.

In the example implementation, LPN service broker 334 may include a "recommendations object" function which for a given user and given user metadata (e.g. the user's IP address, the Browser metadata, etc.) returns a recommendations object (e.g., recommendations object 139). The returned recommendations object may include the recommendations provided by one or more of the microservices included in LPN web service 400.

It will be understood that system 300 may utilize machine learning techniques to update or refine LPN rules 354 and other aspects of the system (e.g., semantic reasoner logic, LPN service broker, micro services, databases, etc.) to continually improve system performance and efficiency. Additional facts inferred by semantic reasoner may be incorporated in local databases and LPN rules 354 so that repeated operation of the semantic reasoner to infer the same additional facts can be avoided. For example, based on the example semantic reasoner operation (regarding a user located in South Africa) discussed in the foregoing, machine learning may create a new LPN rule that automatically attributes low internet connection quality to all users in South Africa and recommends disabling streaming video features for localizing and personalizing computer applications for all users in South Africa, without a need to operate the semantic reasoner again to discover the fact that South Africa has poor quality internet connections or to infer the additional fact the users in South Africa have poor quality Internet connections that are prone to frequent interruptions or breaks.

FIG. 5 shows an example method 500 for combined localization and personalization of a computer application presented to a particular user on a client computer device, in accordance with the principles of the present disclosure.

The computer application, which may be hosted on one or more physical or virtual machines (e.g., in a cloud computing network), may initially include an application UI and core application logic for the generic functions of the application. The application UI may represent a front end of the computer application on the client computer device, through which a user may interact with, or access, the computer application. The computer application may be localized or personalized for the user by adding a reusable application logic module to the core application logic to modify, extend, delete or add to the initial functions of the computer application.

Method 500 includes providing, by a server, a combined localization and personalization (LPN) web service to the computer application (510), receiving a call from the computer application for recommendations to localize and personalize the computer application for a particular user (520), preparing a recommendation on which one or more reusable application logic modules to attach to the core logic of the computer application to localize and personalize application for the particular user (530); providing the recommendation to the computer application (540); and presenting the computer application with the recommended one or more reusable application logic modules attached to the core logic of the computer application as the localized and personalized (LPN) application to the particular user (550).

In method 500, providing, by a server, a combined localization and personalization (LPN) web service to the computer application 510 may include implementing a microservices architecture (MSA) and providing the web service as a combination of one or more microservices (512). Each of the microservices may be configured to provide a respective recommendation on which on which one or more reusable application logic modules to include in the LPN application.

Providing the web service as a combination of one or more microservices 512 may include using a base microservice to retrieve user metadata from a database and making the retrieved user metadata available for processing to the other microservices that may have also been called to get their respective recommendations (514). Method 500 may further include combining the respective recommendations received from the individual microservices in a shared object.

Receiving a call from the computer application for recommendations to localize and personalize the application for a particular user 520 may include receiving the call at application run-time (522).

Further, preparing a recommendation on which one or more reusable application logic modules to attach to the core logic of the computer application to localize and personalize application for the particular user 530 may include applying a pre-determined LPN rule to user information to select the one or more reusable application logic modules to attach to the core logic of the computer application (532).

Applying a pre-determined LPN rule to user information 532 may include retrieving user metadata on one or more of personal, cultural and behavioral characteristics of the user, technical characteristics of the client computer device used to access the computer application, and explicit user feedback (534).

In method 500, providing the recommendation to the computer application 540 may include providing the recommendations to the computer application via a shared recommendations object (542). Further, providing the recommendation to the computer application 540 may include delivering the recommendations using push communications (544).

The various systems and techniques described herein may be implemented in digital electronic circuitry, or in computer hardware, firmware, or in combinations of thereof. The various techniques may implemented as a computer program product, i.e., a computer program tangibly embodied in a non-transitory machine readable storage device, for execution by, or to control the operation of, data processing apparatus, e.g., a programmable processor, a computer, or multiple computers.

Method steps may be performed by one or more programmable processors executing a computer program. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for combined localization and personalization of a computer application for a particular user, the localized and personalized (LPN) computer application presented to the user on a client computer device, the method comprising:
    providing, by a server, a combined localization and personalization (LPN) web service to the computer application;
    receiving a call from the computer application for recommendations to localize and personalize application logic of the computer application for a particular user;
    retrieving user metadata on one or more personal, cultural, or behavioral characteristics of the user, technical characteristics of a client computer device used to access the computer application, or explicit user feedback;
    preparing a recommendation on which one or more reusable application logic modules to attach to a core logic of the computer application to localize and personalize the computer application for the particular user, wherein the recommendation on which one or more reusable application logic modules to attach to the core logic of the computer application to localize and personalize the computer application for the particular user is based at least on the one or more personal, cultural, or behavioral characteristics of the user, technical characteristics of a client computer device used to access the computer application, or explicit user feedback, and wherein the LPN web service is implemented as a combination of a plurality of microservices, the microservices being configured to provide respective recommendations on which of the one or more reusable application logic modules to attach to the core logic of the computer application; and
    providing the recommendation to the computer application to set up the LPN computer application.

2. The method of claim 1, wherein providing the recommendation to the computer application includes providing the recommendation to the computer application via a shared recommendations object.

3. The method of claim 1, wherein providing the recommendation to the computer application includes delivering the recommendation using push communications.

4. The method of claim 1 further comprising presenting the computer application with the recommended one or more reusable application logic modules attached to a core logic of the computer application as the localized and personalized (LPN) application to the particular user.

5. The method of claim 1, wherein receiving a call from the computer application includes receiving the call at application run-time.

6. The method of claim 1, wherein preparing a recommendation on which one or more reusable application logic modules to attach to a core logic of the computer application to localize and personalize the computer application for the particular user includes applying a pre-determined LPN rule to user information to select the one or more reusable application logic modules to recommend for inclusion in the computer application.

7. The method of claim 1, wherein implementing the LPN web service as a combination of a plurality of microservices includes using a base microservice to retrieve user metadata from a database and making the retrieved user metadata available for processing to the other microservices.

8. The method of claim 1 further comprising combining the respective recommendations received from individual microservices in a shared object.

9. A system for combined localization and personalization of a computer application presented to a particular user on a client computer device, the system comprising a memory and a semiconductor-based processor, the memory and the processor forming one or more logic circuits configured to:
    provide a combined localization and personalization (LPN) web service to the computer application;
    receive a call from the computer application for recommendations to localize and personalize application logic of the computer application for the particular user;
    prepare a recommendation on which one or more reusable application logic modules to attach to a core logic of the computer application to localize and personalize the computer application for the particular user, wherein the LPN web service is implemented as a combination of a plurality of microservices, the microservices being configured to provide respective recommendations on which of the one or more reusable application logic modules to attach to the core logic of the computer application, and wherein the respective recommendations are combined in a shared recommendations object; and
    provide the recommendation to the computer application to set up the computer application, wherein providing the recommendation comprises providing the shared recommendations object.

10. The system of claim 9, wherein the logic circuits are configured to provide the recommendation to the computer application via the shared recommendations object.

11. The system of claim 9, wherein the logic circuits are configured to provide the recommendation using push communications.

12. The system of claim 9, wherein the logic circuits are configured to present the computer application with the recommended one or more reusable application logic modules attached to a core logic of the computer application as a localized and personalized (LPN) application to the particular user.

13. The system of claim 9, wherein the logic circuits are configured to receive the call from the computer application at application run-time.

14. The system of claim 9, wherein the logic circuits are configured to prepare the recommendation on which one or more reusable application logic modules to attach to a core logic of the computer application to localize and personalize the computer application for the particular user by applying a pre-determined LPN rule to user information to select the one or more reusable application logic modules to recommend for inclusion in the computer application.

15. The system of claim 14, wherein the logic circuits are configured to apply the pre-determined LPN rule to user information by retrieving user metadata on one or more of personal, cultural and behavioral characteristics of the user, technical characteristics of the client computer device used to access the computer application, or explicit user feedback.

16. The system of claim 9, wherein the logic circuits are configured to use a base microservice to retrieve user metadata from a database and make the retrieved user metadata available for processing to the other microservices.

17. A computer-program product comprising computer-executable instructions embodied in a non-transitory machine readable storage device that, when executed, causes a computing system to perform a method of combined localization and personalization of a computer application for a particular user, the localized and personalized (LPN) computer application presented to the user on a client computer device, the method comprising:

providing, by a server, a combined localization and personalization (LPN) web service to the computer application;

receiving a call from the computer application for recommendations to localize and personalize application logic of the computer application for a particular user;

preparing a recommendation on which one or more reusable application logic modules to attach to a core logic of the computer application to localize and personalize the computer application for the particular user; and providing the recommendation to the computer application to set up the LPN computer application;

wherein:

the LPN web service is implemented as a combination of a plurality of microservices, the microservices configured to provide respective recommendations on which one or more of the reusable application logic modules to include in the computer application;

the respective recommendations received from the microservices are combined in a shared recommendations object; and providing the recommendation to the computer application comprises providing the shared recommendations object to the computer application.

* * * * *